No. 701,132. Patented May 27, 1902.
P. B. T. BERNER.
FISH HOOK.
(Application filed Apr. 10, 1901.)
(No Model.)
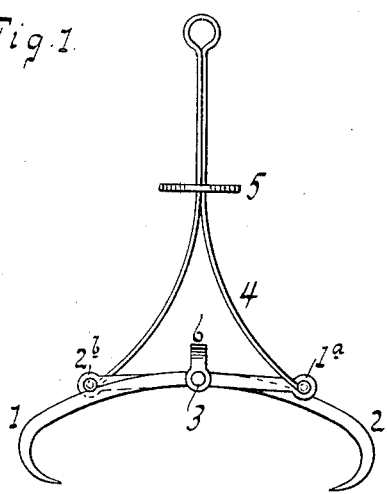
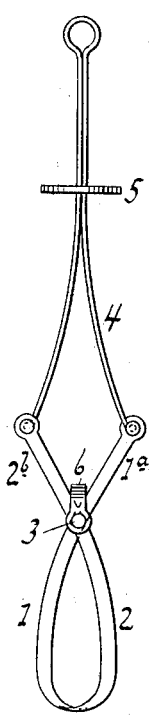
WITNESSES:
INVENTOR
Paul B. T. Berner
BY
ATTORNEY

United States Patent Office.

PAUL B. T. BERNER, OF BROOKLYN, NEW YORK.

FISH-HOOK.

SPECIFICATION forming part of Letters Patent No. 701,132, dated May 27, 1902.

Application filed April 10, 1901. Serial No. 55,200. (No model.)

*To all whom it may concern:*

Be it known that I, PAUL B. T. BERNER, a subject of the Emperor of Germany, residing at Brooklyn borough, New York city, in the county of Kings, State of New York, have invented new and useful Improvements in Fish-Hooks, of which the following is a specification.

This invention resides in certain novel details of construction set forth in the following specification and claims, and illustrated in the annexed drawings, in which—

Figure 1 shows the hook open or set at one side of the dead-center line. Fig. 2 shows the hook closed or sprung past or to the other side of the dead-center line, as when holding a fish caught.

The "fish-hook," so called, consists of two hooks or members 1 and 2, pivoted at 3. When in position as in Fig. 1, the hooks are baited and let into the water, and the nibbling at one or both hooks causes the latter to be swung off the dead-center, so as to spring together or close, Fig. 2. This prevents dropping off of the fish. The hooks are forced together by spring 4, jointed to their inner arms or ends $1^a 2^b$, and the pressure of this spring is regulated by the ring 5. The bail 6 at joint or pivot 3 forms a stop, Fig. 2, against excessive closure of the hook members. The hooks can close sufficiently to secure or hold a fish, but are prevented from closing or swinging past one another, whereby a fish might be sheared through or torn loose, so as to be freed or lost.

Each hook part or shank 1 or 2 is readily formed in one piece with its inner or spring-engaged portion $1^a$ or $2^b$. The shanks of the spring engage or actuate the members or, rather, the inner end portions $1^a$ and $2^b$, while the bow or eye part of the spring can serve for the attachment of a line. The members or shanks being laid over or made to cross one another, the pivot 3 is readily passed through the members or inserted into place at the point of crossing. Said pivot also serves to support or hold the stop-bail 6 in place. The regulator 5 of the spring by being made disk shape or of appreciable diameter can be made to act as a drag or form a resistance in the water to the movement of the hook, so as to resist a pull of a fish or a tendency to move that may be caused by the snap or swing of the submerged members about the pivot. The adjuster can be used under various conditions, as to increase the closing tension of spring-shanks, which tend to move the parts $1^a 2^b$ toward one another, or to convert a spring whose shanks tend to open or spread into the reverse—that is to say, a closing-spring. That is to say, if the shanks normally spread then by moving the adjuster far enough toward the free ends of the spring-shanks the same may be pressed together or made to swing the ends $1^a 2^b$ shut. On the other hand, when the ring is slid toward or to the bow or joining ends of the spring-shanks the latter can be left to assume normal position—that is, to spring apart or spread. The hook members when closing have a tendency to lengthen, as seen by comparing Figs. 1 and 2, or, in other words, the hooks, so to say, follow after or pursue a fish pulling away from the line.

What I claim as new, and desire to secure by Letters Patent, is—

1. A fish-hook comprising spring-actuated pivoted members and an adjuster for the spring substantially as described.

2. A fish-hook comprising pivoted members, a spring for actuating the members, and a disk-shaped slide made to regulate the action of the spring and to act as a drag substantially as described.

3. A fish-hook comprising crossing members pivoted together, a spring for actuating the members, and a regulator adjustable on the spring for changing the action of the latter from opening to closing substantially as described.

In testimony whereof I have hereunto set my hand in the presence of two subscribing witnesses.

PAUL B. T. BERNER.

Witnesses:
CHAS. E. POENSGEN,
E. F. KASTENHUBER.